United States Patent

Slaughter

(10) Patent No.: US 8,381,804 B2
(45) Date of Patent: Feb. 26, 2013

(54) TWIST VANE COUNTER-PARALLEL FLOW HEAT EXCHANGER APPARATUS AND METHOD

(75) Inventor: Victor Blake Slaughter, Manchester, MO (US)

(73) Assignee: The Boeing Company, Chicago, IL (US)

(*) Notice: Subject to any disclaimer, the term of this patent is extended or adjusted under 35 U.S.C. 154(b) by 1193 days.

(21) Appl. No.: 11/868,202

(22) Filed: Oct. 5, 2007

(65) Prior Publication Data

US 2009/0090493 A1    Apr. 9, 2009

(51) Int. Cl.
*F28F 9/02* (2006.01)
*F28D 7/02* (2006.01)

(52) U.S. Cl. ...................................... 165/165; 165/174

(58) Field of Classification Search ............... 165/165, 165/174, 176, 78, 166; 137/561 A
See application file for complete search history.

(56) References Cited

U.S. PATENT DOCUMENTS

| 2,092,835 | A | * | 9/1937 | Edwards | 165/300 |
| 2,812,165 | A | * | 11/1957 | Hammond | 165/166 |
| 3,363,681 | A | * | 1/1968 | Revilock et al. | 165/166 |
| 3,460,611 | A | * | 8/1969 | Tramuta et al. | 165/166 |
| 4,524,823 | A | * | 6/1985 | Hummel et al. | 165/174 |
| 5,029,639 | A | * | 7/1991 | Finnemore et al. | 165/166 |
| 5,265,673 | A | * | 11/1993 | Hucsko | 165/176 |
| 6,896,043 | B2 | * | 5/2005 | Dunn | 165/165 |
| 2005/0126746 | A1 | * | 6/2005 | D'Souza | 165/4 |

FOREIGN PATENT DOCUMENTS

JP         04020733 A  *  1/1992

* cited by examiner

*Primary Examiner* — Tho V Duong
(74) *Attorney, Agent, or Firm* — Harness, Dickey & Pierce, P.L.C.

(57) ABSTRACT

A heat exchanger and method that includes the use of at least one manifold having a plurality of vanes for circulating a fluid requiring cooling. The vanes define a pair of adjacent flow channels that each has a changing cross sectional shape that varies the aspect ratio of the adjacent flow channels defined by each vane. Each vane also has a twisting or spiral shape that serves to change the orientation of each of its adjacent flow channels to even more effectively enable transfer of heat from a first fluid flowing within one of the flow channels to a second fluid flowing in the other adjacent flow channel. In various embodiments both counter-direction flow and same-direction flows are employed in the manifold.

17 Claims, 13 Drawing Sheets

TWIST VANE COUNTER-PARALLEL FLOW HEAT EXCHANGER APPARATUS AND METHOD

FIELD

The present disclosure relates to heat exchangers, and more particularly to heat exchanger having a manifold design that enables a counter-parallel flow of fluids, as well as increased surface contact area for the fluids, that contributes to increased heat exchange efficiency without significantly adding to the manufacturing complexity of the manifold.

BACKGROUND

The statements in this section merely provide background information related to the present disclosure and may not constitute prior art.

Heat exchangers are traditionally used to transfer heat from one fluid flowing therethrough to a different medium, for example to air or to a different fluid. Heat exchangers that attempt to provide a counter flowing arrangement, where the fluid to be cooled is flowed in a direction opposite to a cooling fluid, have generally proved to be quite complex and expensive to manufacture, or of limited effectiveness in increasing the heat exchange performance of the device. The manifolds used with such devices have typically been even more expensive and complex to construct than the heat exchanger core of the apparatus. A heat exchanger having improved cooling efficiency, that does not add appreciably to the overall cost or complexity of the apparatus, nor specifically to the cost and complexity of the manifolds used therewith, would be highly advantageous.

SUMMARY

The present disclosure relates to a heat exchanger having a manifold that enables a counter-flow of fluids within the heat exchanger, as well as increases a surface contact area of the fluid flow paths within the manifold to thus provide improved heat exchange efficiency. In one embodiment a heat exchanger is disclosed having a manifold that incorporates a plurality of spaced apart vanes that each defines fluid flow paths. Each vane has a generally twisting shape from a first end to a second end thereof. In one embodiment the aspect ratio of the volumes isolated by the vane also changes along its length. Thus, fluid flowing by each vane effectively contacts a greater amount of surface area of the vane as the fluid flows from the first end to the second end of each vane.

In one specific embodiment the vanes of the manifold are spaced apart, and an interior area between two adjacent vanes is used to receive a portion of a first fluid entering the manifold and to direct the fluid to a second end of the vane. The outer surfaces of adjacent vanes are used to help form counter-parallel flow paths between each pair of adjacent vanes. The counter-parallel flow paths enable a second fluid to be flowed in a direction counter, but generally parallel, to the first fluid. The sum of the cross-sectional areas of the channels defined by the vanes is approximately the same as the cross sectional area of the inlet of the manifold.

The twisting vanes of the various embodiments of the heat exchanger manifold all separate, change the aspect ratio of a flow path, and prepare the fluids for entrance and exit into the body of the exchanger to thus increase heat exchanger efficiency without unnecessarily complicating the construction or cost of the manifold. Advantageously, a counter-parallel flow manifold construction is provided that further enhances the heat exchange capability of the heat exchanger.

BRIEF DESCRIPTION OF THE DRAWINGS

The drawings described herein are for illustration purposes only and are not intended to limit the scope of the present disclosure in any way.

DETAILED DESCRIPTION

Figure 1:
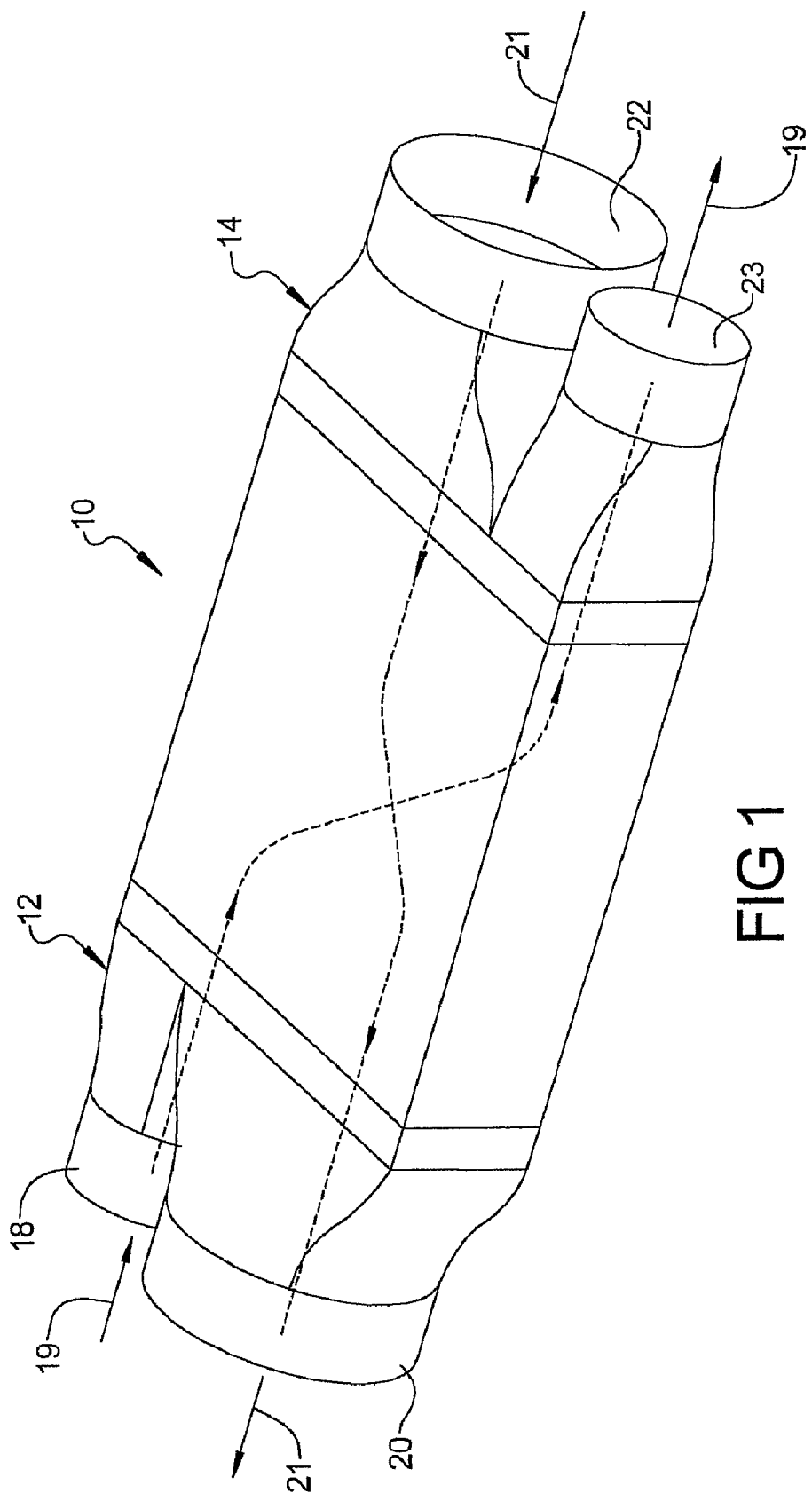
FIG. 1 is a perspective view of one embodiment of a heat exchanger in accordance with the present disclosure that includes a counter-parallel-flow manifold.

Referring to FIG. 1, a heat exchanger 10 in accordance with one embodiment of the present disclosure is illustrated. The heat exchanger in this example includes manifolds 12 and 14 that are arranged on opposite sides of a heat exchanger core 16. In this example the manifolds 12 and 14 are identical in construction, but they need not be. It will be appreciated also that the dimensions and construction of the heat exchanger core 16 will dictate, at least in part, the outer dimensions of the manifolds 12 and 14, as well as their dimensions.

In FIG. 1 manifold 12 has an inlet 18 and an outlet 20. Manifold 14 similarly has an inlet 22 and an outlet 23. In this example the inlets and outlets have different diameters, but they could just as readily have the same diameter. In general operation, a fluid 19 may enter the inlet 18 of manifold 12 and circulate through the heat exchanger core 16, where a major portion of heat transfer occurs to a cooling medium 21, before the fluid exits outlet 23. The cooling medium 21 may flow from inlet 22 to outlet 20, and counter and parallel to the fluid 19. The cooling medium 21 may be comprised of a liquid, a gas or any other fluid cooling medium that is flowable and capable of assisting in absorbing heat from the fluid entering inlet 18. Similarly, fluid 19 may be comprised of a liquid, a gas or any other flowable medium that requires cooling.

Figure 2:
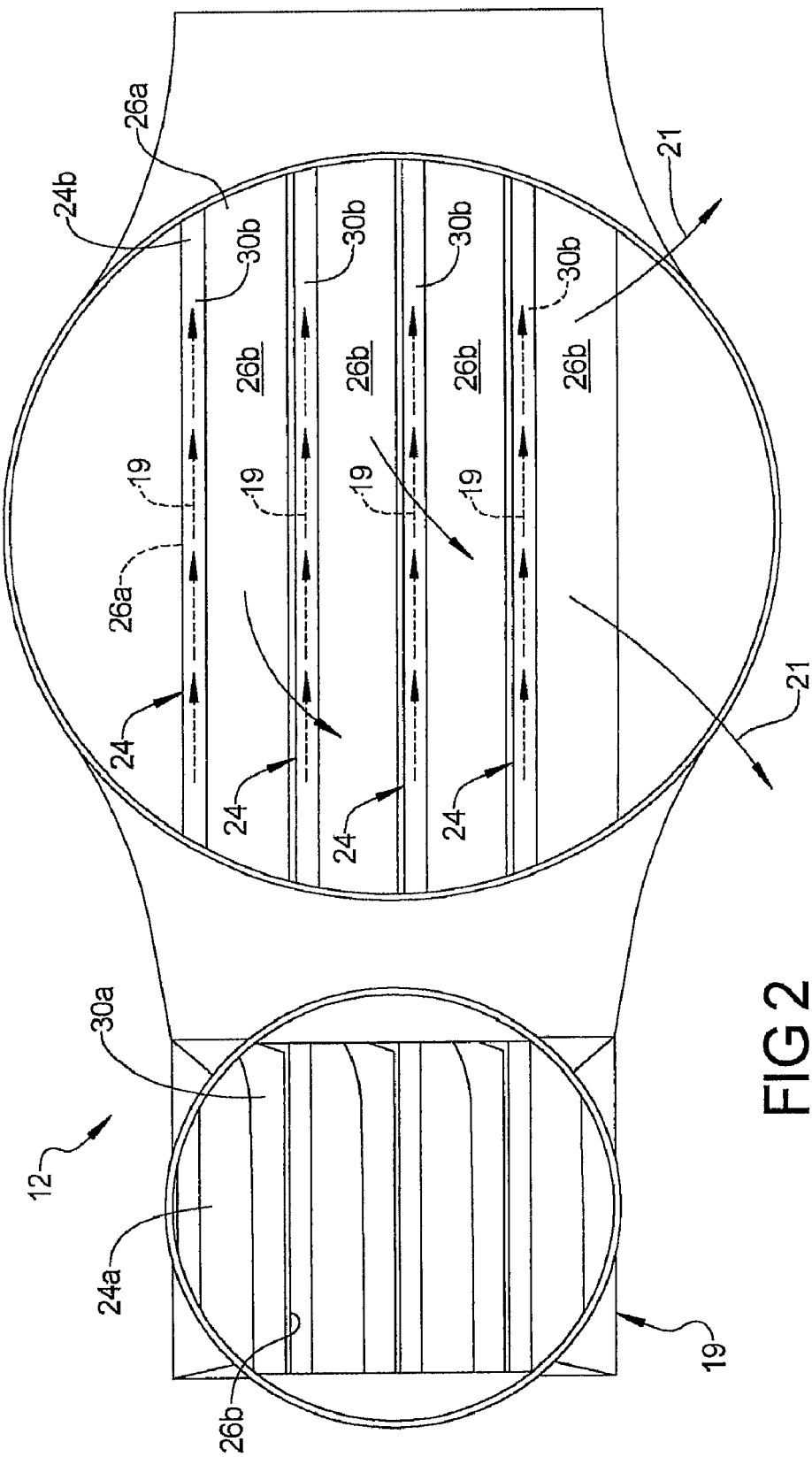
FIG. 2 is a view in accordance with directional line 2 in FIG. 1 looking directly into a manifold of the heat exchanger, and further illustrating how fluid may flow into an inlet port of the manifold and be deflected upwardly and to the right by the construction of vanes within the manifold.
Figure 3:
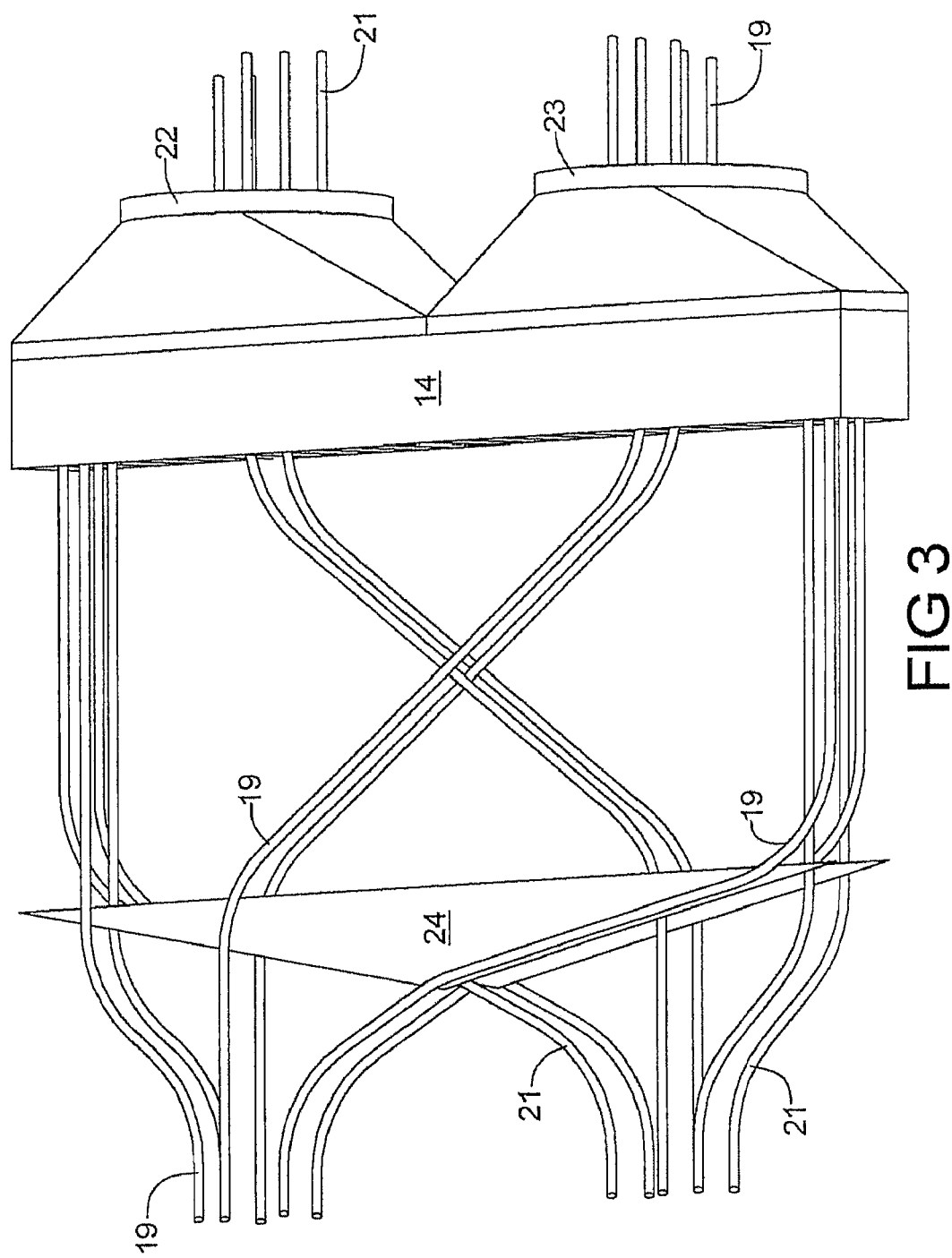
FIG. 3 is a highly simplified plan representation of the heat exchanger of FIG. 1, but with a portion of the left manifold removed to illustrate the fluid flow paths of the counter-parallel flow arrangement that the heat exchanger provides.
Figure 4:
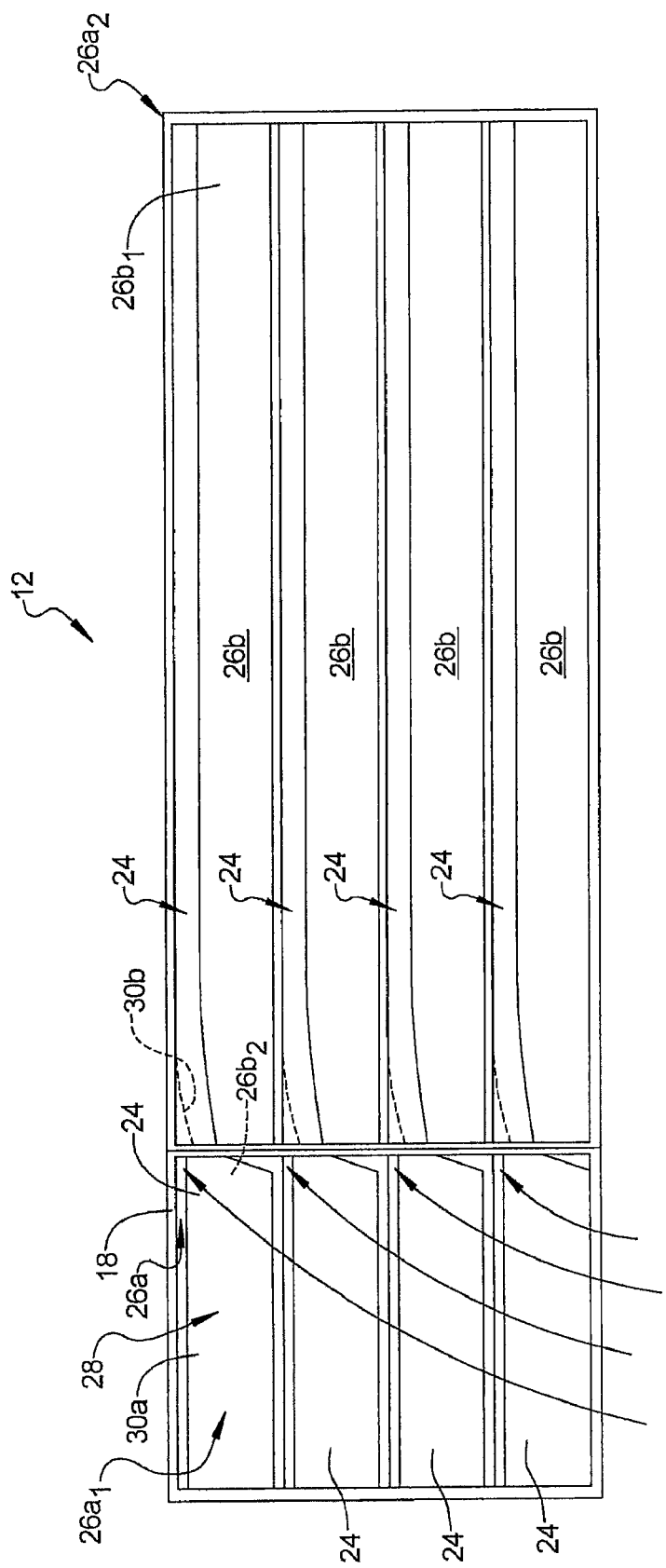
FIG. 4 is a view of the vanes taken from the perspective of FIG. 2, with the inlet and outlet structure removed to better illustrate the spacing of the vanes and their external shape.
Figure 5:
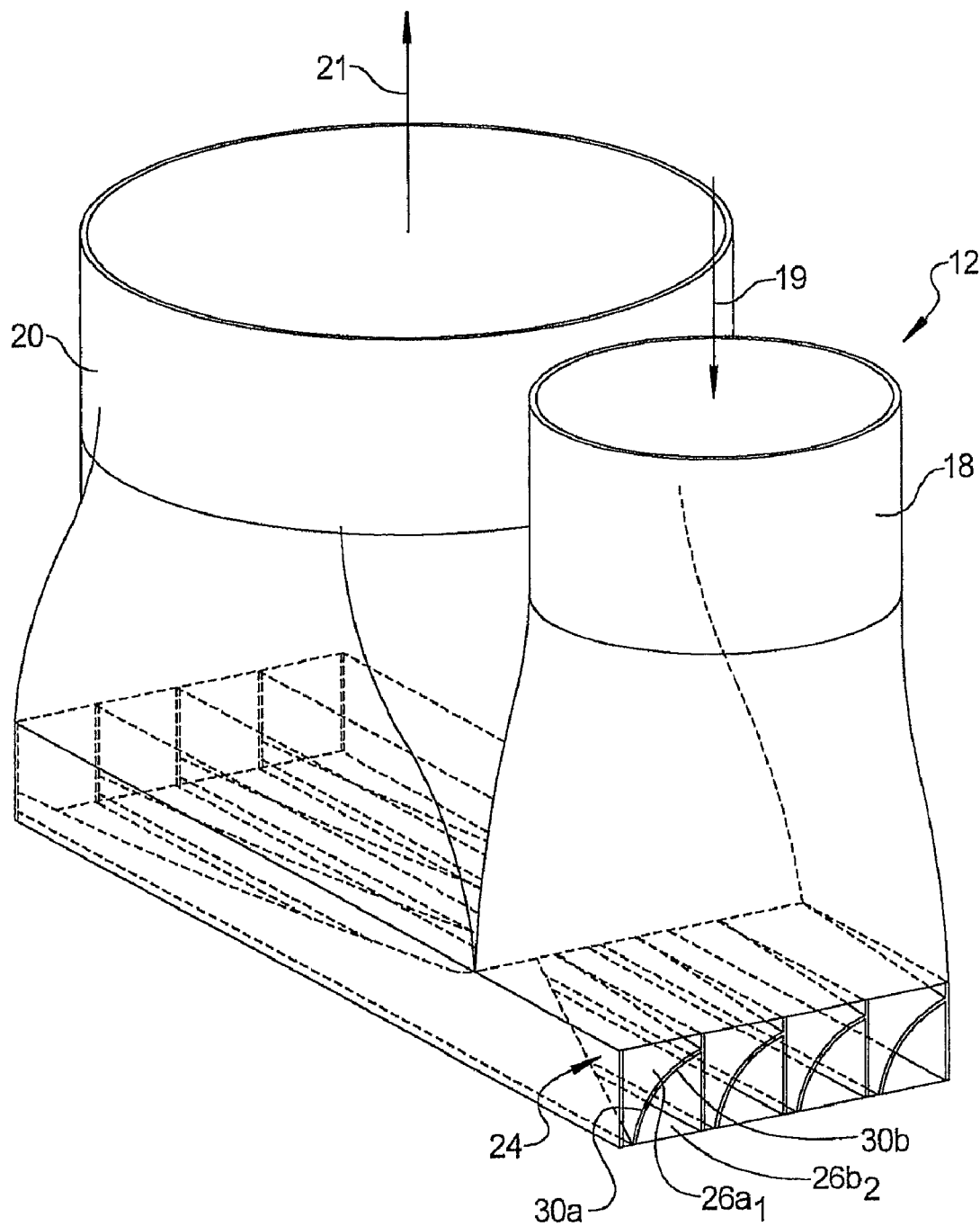
FIG. 5 is a partial perspective view of one manifold of the heat changer with a portion of its wall structure broken away to help illustrate the shape of the vanes.
Figure 6:
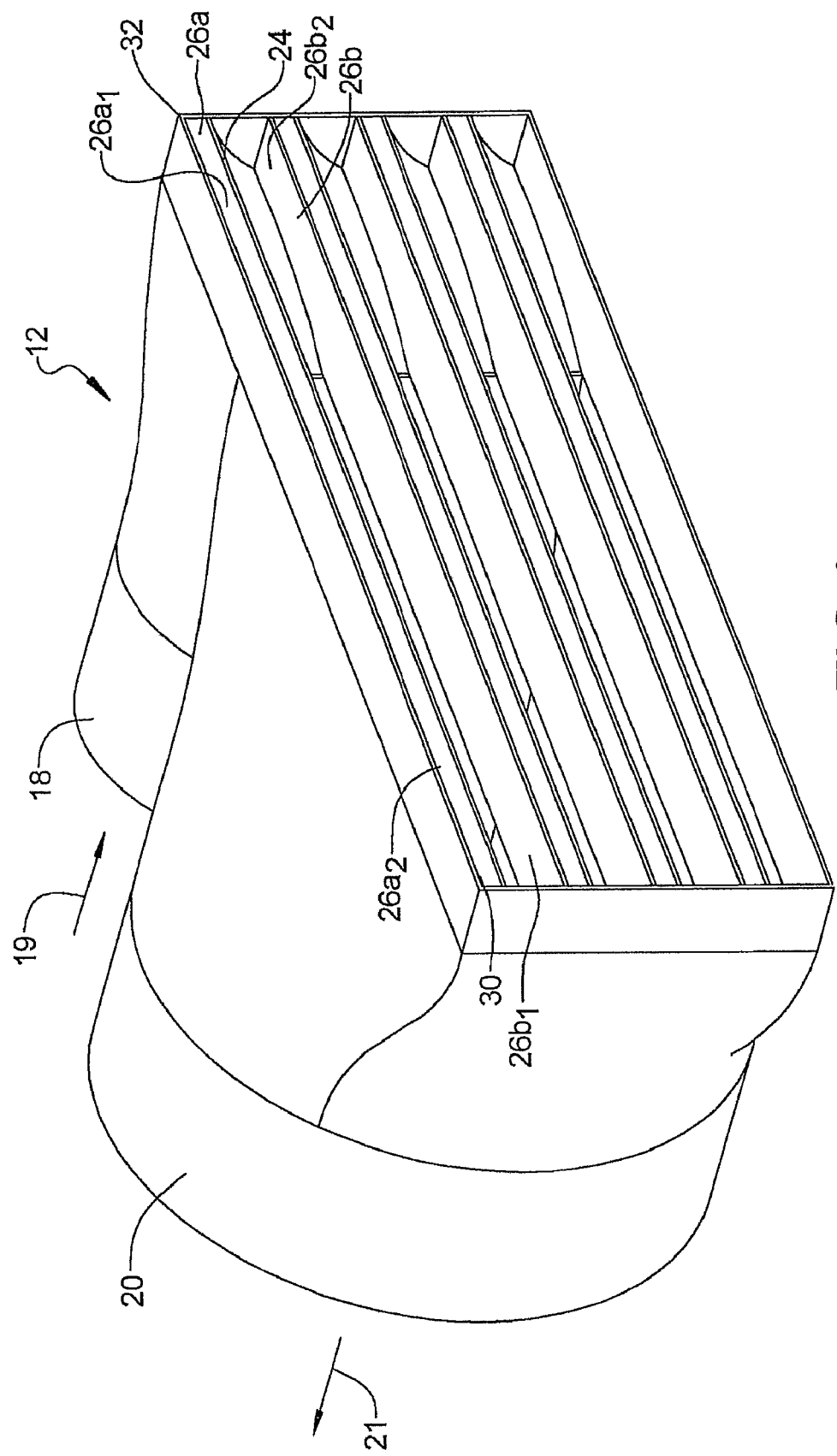
FIGS. 6 through 13 are cross sections through the manifold in FIG. 5 to illustrate the changing aspect ratio and changing orientation of the vane along its length.
Figure 7:
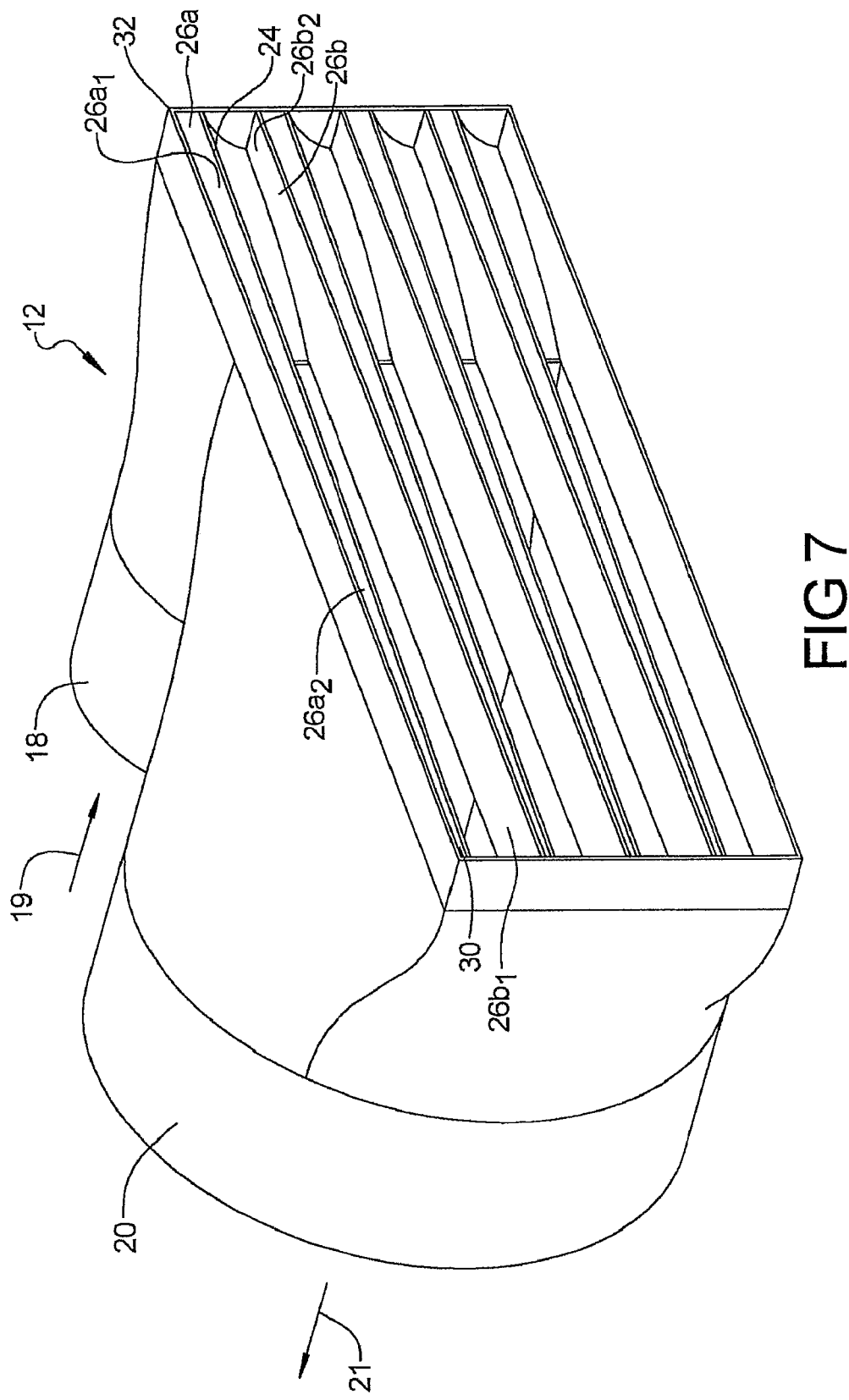
Figure 8:
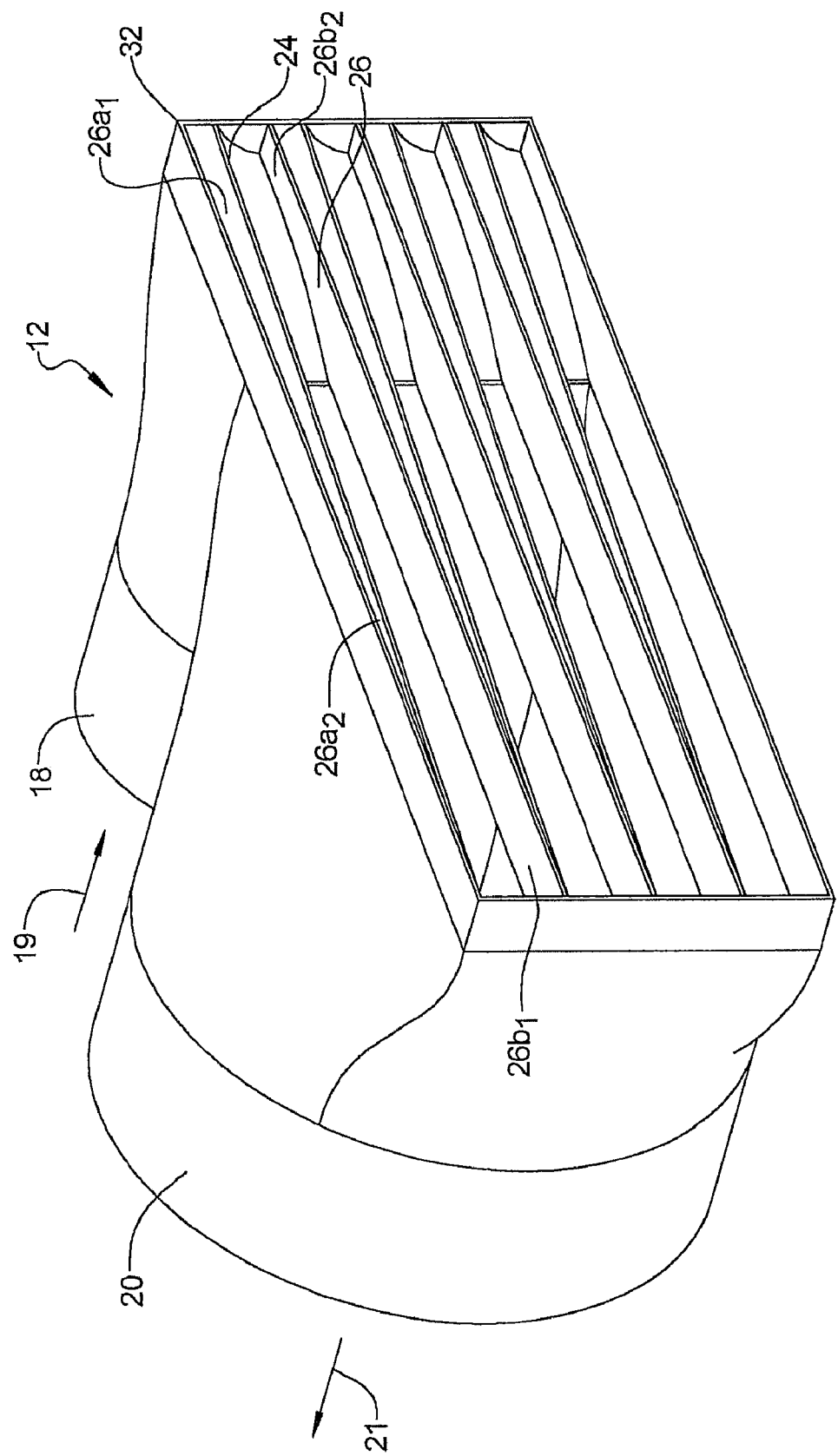
Figure 9:
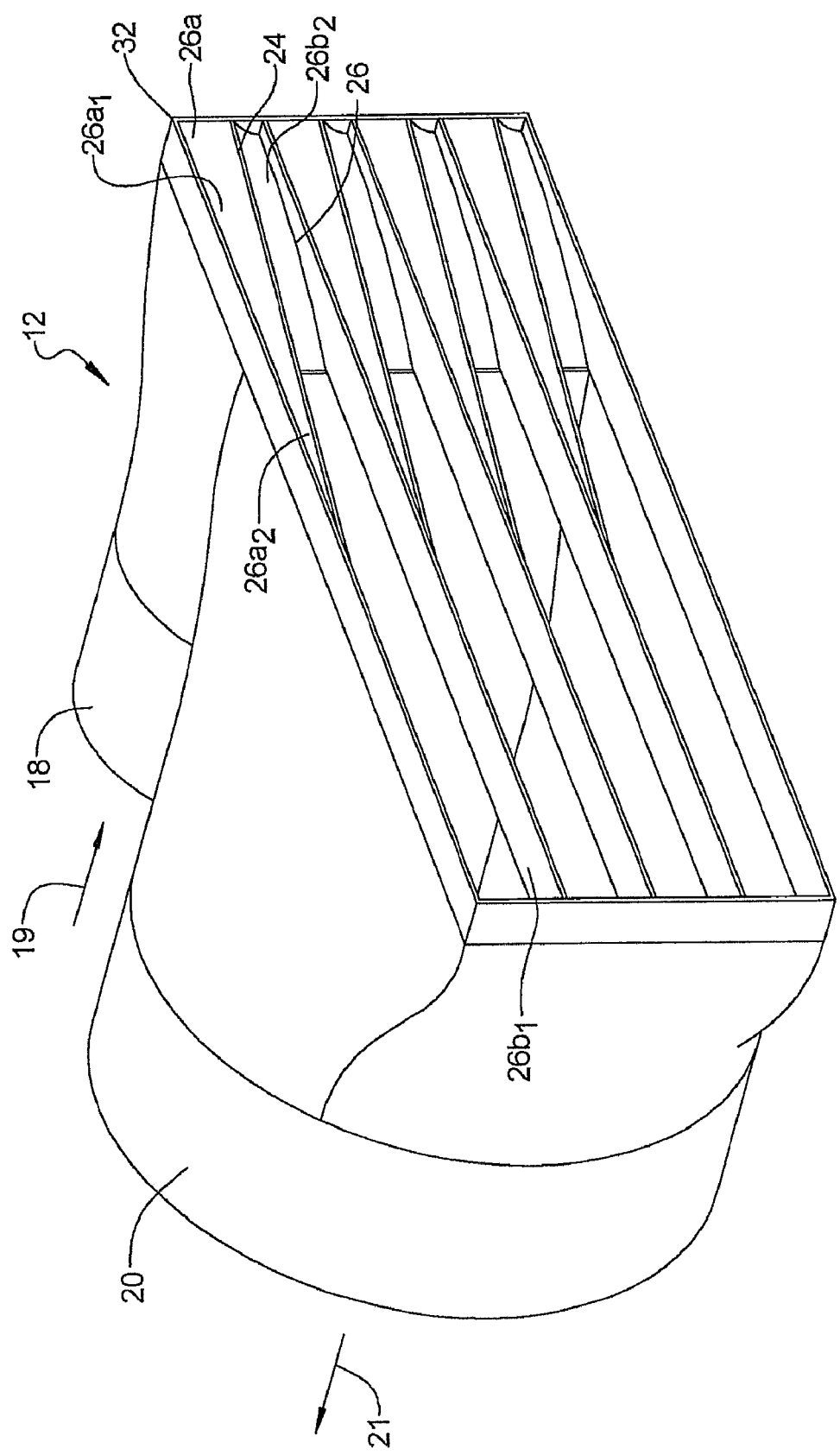
Figure 10:
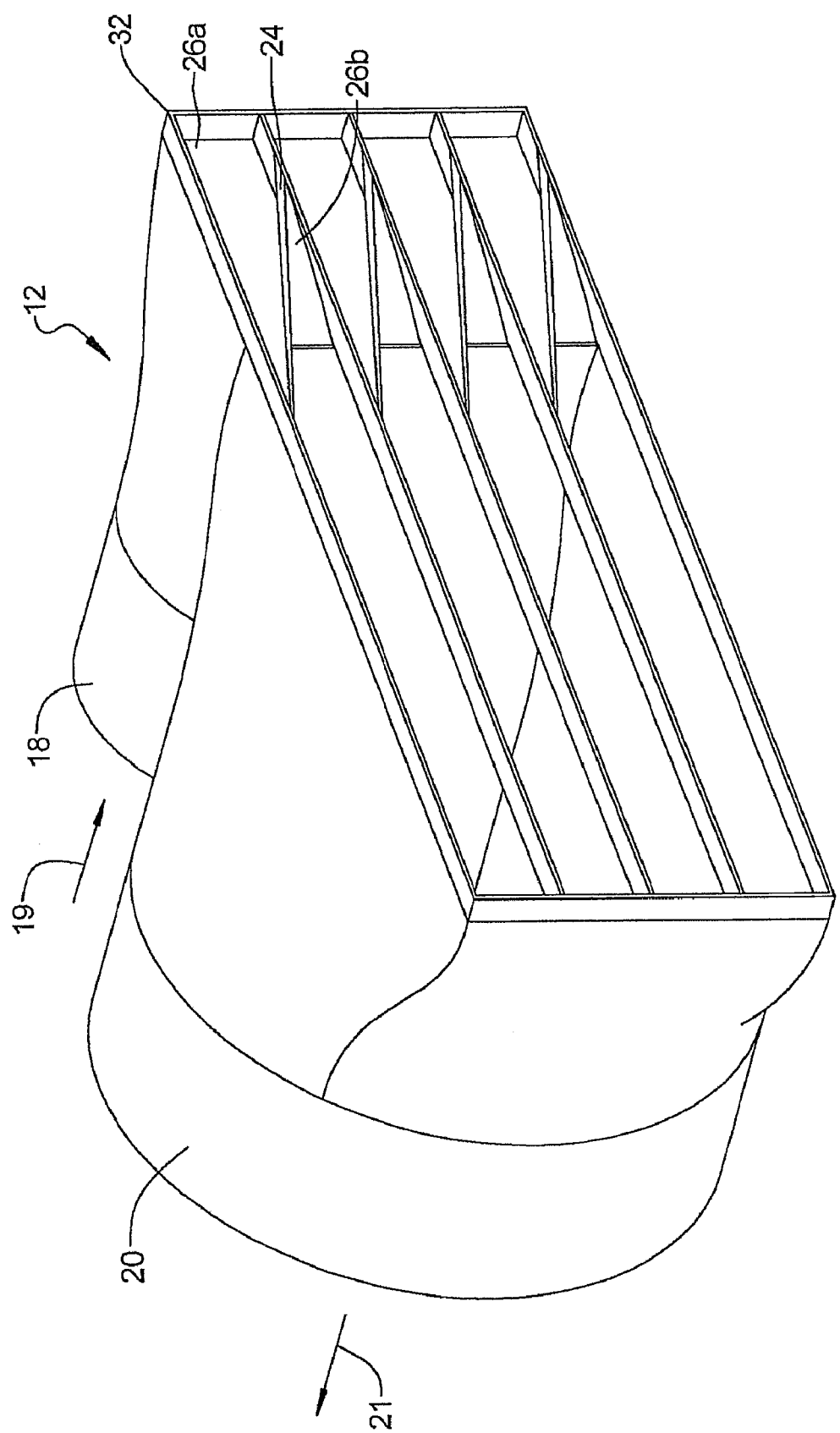
Figure 11:
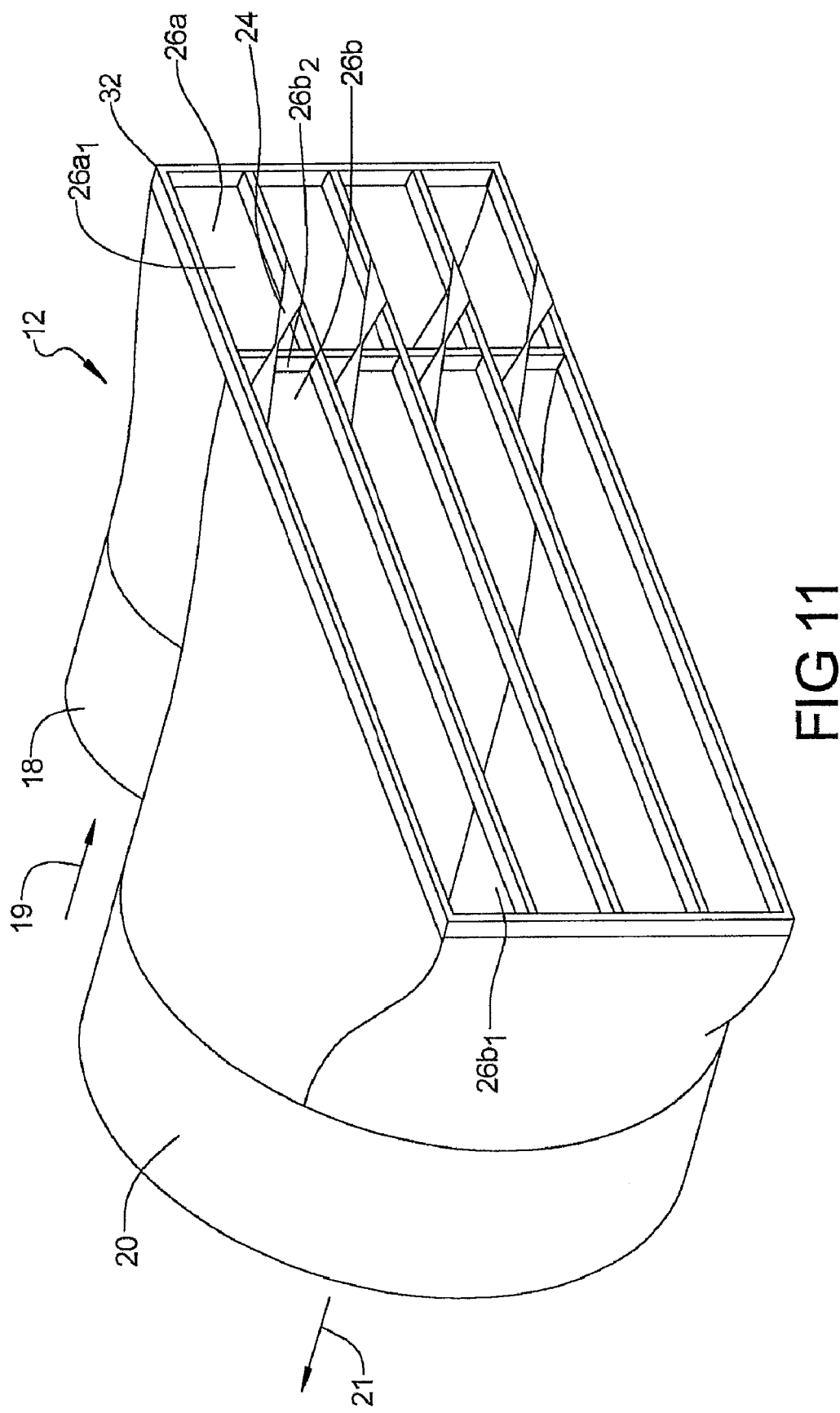
Figure 12:
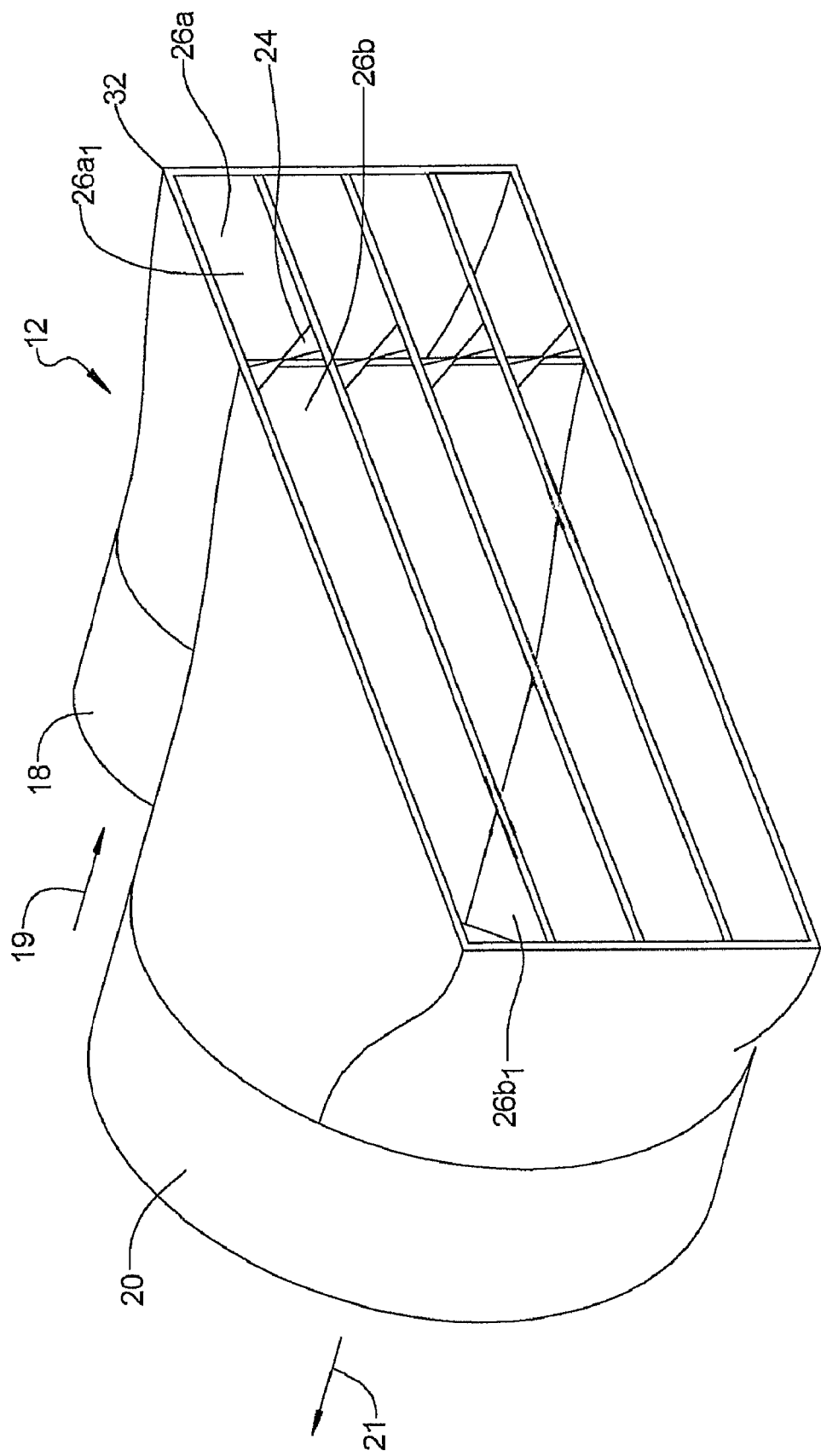
Figure 13:
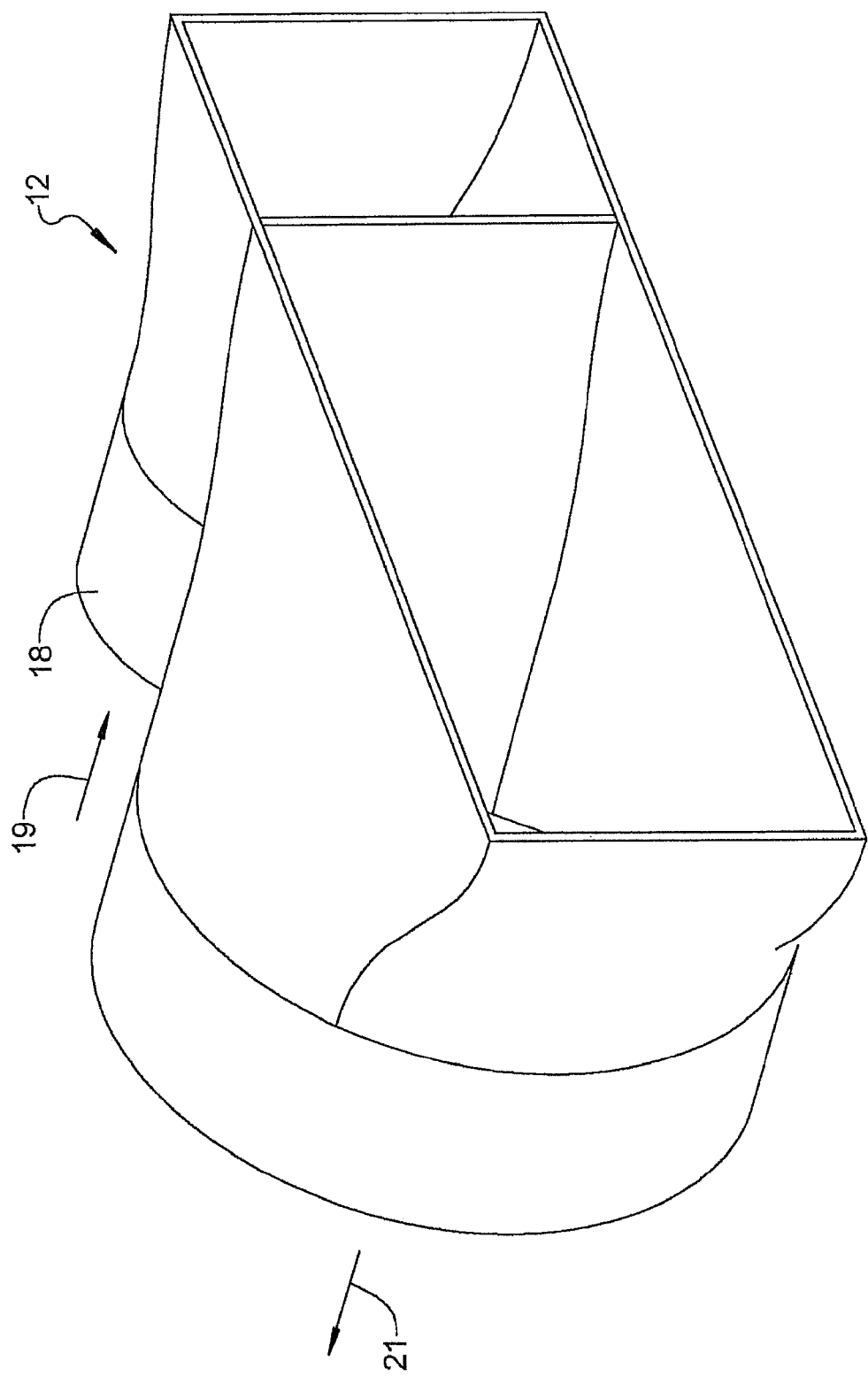

Referring to FIGS. 2 and 4, a portion of the interior construction of the manifold 12 can be seen from a view looking straight into the inlet port 18 and outlet port 20. Since manifolds 12 and 14 are identical in construction, only the construction of manifold 12 will be described in detail. Manifold 12 includes a plurality of vanes 24 that are arranged generally parallel to one another and spaced apart from one another. Each of the vanes 24 forms two adjacent flow channels, first flow channel 26a and second flow channel 26b. Each vane 24 further has a first end 24a and a second end 24b. First flow channel 26a enables fluid 19 to flow therethrough, while the adjacent second flow channel 26b enables the cooling medium 21 to flow therethrough counter to, but generally parallel to, the fluid 19. Each of channels 26a has an input end 26a1 and an output end 26a2, and each of channels 26b has an input end 26b1 and an output end 26b2. FIG. 3 further schematically illustrates the counter flowing paths that the fluid 19 and the cooling medium 21 may take within the heat exchanger core 16. It can also be seen From FIGS. 2 and 3 that the flow paths for the fluid 19 and the cooling medium 21 are arranged in alternating fashion to maximize heat transfer from the fluid 19 to the cooling medium 21. Opposing surface portions 30a and 30b (FIGS. 2 and 5) of each vane 24 help to define the flow channels 26a and 26b.

It is a benefit that the sum of cross sectional areas of all of the channels 26a and 26b defined by the vanes 24 approximately equals the cross sectional area of the inlet 18. This is advantageous for maintaining a constant pressure in each manifold 12 and 14, and avoiding a pressure drop across the heat exchanger 10. However, it will be appreciated that if the needs of a particular application should dictate, that this ratio could be varied so that a greater or lesser cross sectional flow path area is provided for by the vanes 24. Additionally, the first and second fluids 19 and 21 could be flowed in the same direction if desired.

Referring to FIG. 4, when the fluid 19 enters the inlet 18 and begins to flow into the first flow channel 26a, a portion 28 of each vane 24 deflects the fluid vertically and also turns the fluid 19 about a twisting or spiral path as the fluid 19 begins to flow into the first flow channel 26a. Conversely, cooling fluid 21 returning to manifold 12 from the other manifold 14 will be deflected downwardly by each vane 24 as it enters the adjacent, second flow channel 26b, and will flow along the second flow channel 26b in a twisting or spiral path, but in the opposite sense as the fluid 19 flowing through the first flow channel 26a.

From FIGS. 5-13, the cross-sectional shape and orientation of the two adjacent flow channels (i.e., paths) 26a and 26b formed by each vane 24 can be seen to change along the length of the vane. In FIGS. 6-12, the wall portion bridging vane 24 and wall portion 32 of the manifold 12 has been removed to reveal the interior area that forms the first flow channel 26a.

In particular, it will be noted that the aspect ratios (i.e., ratio of height-to-width) of the two adjacent flow channels 26a and 26b defined by the vane 24 both change over the length of the vane in a similar but opposite (i.e., mirror image) sense. This enables a counter-parallel-flow path configuration to be created. The adjacent flow channels 26a and 26b formed by each vane 24 also help to direct a greater portion of each of the fluids 19 and 21 into contact with opposing wall surfaces of the vane 24 as each fluid flows through its respective flow channel 26a or 26b within the manifold 12, thus ensuring more efficient cooling of the fluid 19.

The manifolds 12 and 14, and particularly the vanes 24, may be made from any suitable materials that enable excellent thermal conduction between the fluid 19 and the cooling medium 21. Suitable materials are aluminum, titanium, steel, etc., but it will be appreciated that any suitable having reasonably good thermal conductivity may potentially be employed. The specific materials employed for the manifolds 12 and 14 may also depend in part on the specific types fluid that the manifolds will be used with.

It will also be appreciated that the precise cross sectional shape and twisting orientation of the vanes 24 may be modified to suit the needs of a particular application. Also, the total cross sectional area of the vanes 24 relative to the flow paths 26 may be varied to be suit the needs of a particular application.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A heat exchanger comprising:
a heat exchanger core; and
at least one manifold in fluid flow communication with said heat exchanger core for receiving a first fluid to be cooled by a second fluid;
the manifold including a plurality of vanes defining a corresponding plurality of first flow channels and second flow channels through which said first fluid and said second fluid each flow, where each of said first and second flow channels has a changing aspect ratio along its length, and each said first flow channel has an input end and an output end; and
wherein each said input end includes a ramped portion for deflecting and turning a portion of said first fluid entering each of said first flow channels, and wherein each of said vanes further includes one of a spiral configuration that operates to turn said first fluid in a spiral configuration as said first fluid flows along said first flow channel;
wherein said second fluid flows in a direction within said at least one manifold that is generally parallel to a flow of said first fluid; and
wherein said first and second flow channels are arranged in alternating fashion within the manifold.

2. The heat exchanger of claim 1, wherein opposing surfaces of each said vane help to define each of said first and second flow channels, and wherein said second fluid flows in a direction counter to said first fluid.

3. The heat exchanger of claim 1, wherein said first and second flow channels are arranged in alternating fashion within said at least one manifold such that adjacent first and second fluids are always flowing in opposite longitudinal directions.

4. The heat exchanger of claim 1, wherein said first and second fluids flow in the same direction.

5. The heat exchanger of claim 1, further comprising an additional manifold in fluid communication with said heat exchanger core, such that said heat exchanger core is disposed between said at least one manifold and said additional manifold.

6. The heat exchanger of claim 1, wherein:
said at least one manifold includes an inlet in flow communication with all of said first flow paths;
said input ends are each in communication with said inlet; and
wherein a cross sectional area of said inlet is approximately equal to a collective cross sectional area of all of said first and second flow channels.

7. A heat exchanger comprising:
a heat exchanger core;
at least one manifold in fluid flow communication with said heat exchanger core for receiving a first fluid to be cooled, and a second fluid to absorb heat from the first fluid;
the manifold including a plurality of vanes defining a corresponding plurality of first and second parallel arranged flow channels, portions of said first fluid flow flowing through said first channels, and portions of said second fluid flowing through said second channels, where each of said first flow channels has a changing aspect ratio along its length;

said first and second flow channels each being twisted to each form a spiral flow path;

wherein each said first flow channel has an input end and an output end; and wherein each said input end includes a ramped portion for deflecting and turning a portion of said first fluid entering each of said first flow channels, and further such that each said first fluid flows in a spiral path from its associated said input end to its associated said output end, and such that each said second fluid flows in a spiral path;

said at least one manifold includes an inlet in flow communication with all of said first flow channels;

each of said first flow channels includes an input end and an output end, said input ends being in communication with said inlet; and wherein said inlet is at least as large in cross sectional area as a collective cross sectional area of said first and second flow channels.

8. The heat exchanger of claim 7, wherein each of said second flow channels has a changing aspect ratio over its length.

9. The heat exchanger of claim 7, wherein an outer surface of each of said plurality of vanes cooperates to form said first and second flow channels, and wherein said first and second fluids flow counter and parallel to one another.

10. The heat exchanger of claim 9, wherein said second fluid is adapted to cool said first fluid.

11. The heat exchanger of claim 7, wherein said first and second flow channels are arranged in alternating fashion within said at least one manifold such that said first and second fluids are always flowing in opposite directions.

12. The heat exchanger of claim 7, further comprising an additional manifold in fluid communication with said heat exchanger core, such that said heat exchanger core is disposed between said at least one manifold and said additional manifold.

13. The heat exchanger of claim 7, wherein:
a cross sectional area of said inlet is approximately equal to a collective cross sectional area of all of said first and second flow channels.

14. The heat exchanger of claim 13, wherein each said ramped portion operates to deflect and turn a portion of said first fluid entering each of said first flow channels by about 90 degrees.

15. A manifold for a heat exchanger, the manifold comprising:

a plurality of vanes defining a corresponding plurality of adjacent first flow channels and second flow channels, with each said first flow channel having an input end and an output end through which a portion of a first fluid flows, and each said second channel having an input end and an output end through which a portion of a second fluid flows;

each of said first flow channels having a changing aspect ratio along its length; and each said input end includes a ramped portion for deflecting and turning a portion of said first fluid entering each of said first flow channels, and each said vane having a spiral configuration that operates to turn each of said first fluid flows in a spiral path along each said first flow channel;

said manifold further including an inlet in flow communication with all of said first flow channels; and wherein a cross sectional area of said inlet is approximately equal to a collective cross sectional area of all of said first and second flow channels.

16. The manifold of claim 15, wherein opposing outer surfaces of each of said vanes cooperate to form said adjacent fluid flow channels to channel second fluid therethrough generally counter to, and parallel to, said first fluid flowing in said first flow channel.

17. A heat exchanger comprising:
a heat exchanger core; and
at least one manifold in fluid flow communication with said heat exchanger core for receiving a first fluid to be cooled by a second fluid;

the manifold including a plurality of vanes defining a corresponding plurality of first flow channels and second flow channels through which said first fluid and said second fluid each flow, where each of said first and second flow channels has a changing aspect ratio along its length, and each said first flow channel has an input end and an output end; and wherein each said input end includes a ramped portion for deflecting and turning a portion of said first fluid entering each of said first flow channels, and wherein each of said vanes further includes one of a spiral configuration that operates to turn said first fluid in a spiral configuration as said first fluid flows along said first flow channel;

wherein said second fluid flows in a direction within said at least one manifold that is generally parallel to a flow of said first fluid;

wherein said first and second flow channels are arranged in alternating fashion within the manifold; and wherein said first and second fluids flow in a common direction.

* * * * *